(12) United States Patent
Olver et al.

(10) Patent No.: US 8,840,942 B2
(45) Date of Patent: Sep. 23, 2014

(54) FOOD PRODUCT AND METHOD AND APPARATUS FOR BAKING

(75) Inventors: John W. Olver, Blacksburg, VA (US);
Philip J. Domenicucci, Rockaway, NJ (US); John Emery, Annandale, VA (US)

(73) Assignee: Emisshield, Inc., Blacksburg, VA (US)

( * ) Notice: Subject to any disclaimer, the term of this patent is extended or adjusted under 35 U.S.C. 154(b) by 492 days.

(21) Appl. No.: 12/890,391

(22) Filed: Sep. 24, 2010

(65) Prior Publication Data
US 2012/0074122 A1 Mar. 29, 2012

(51) Int. Cl.
*A21B 2/00* (2006.01)
*A21B 1/22* (2006.01)
*A21B 1/48* (2006.01)
*A21B 3/13* (2006.01)
*A21B 3/15* (2006.01)

(52) U.S. Cl.
CPC ... *A21B 2/00* (2013.01); *A21B 1/22* (2013.01); *A21B 1/48* (2013.01); *A21B 3/13* (2013.01); *A21B 3/15* (2013.01)
USPC ............................ 426/243; 426/505; 426/523

(58) Field of Classification Search
CPC .............. A21B 1/06–1/22; A21B 2/00; A21B 1/42–1/48; A21B 3/13; A21B 3/15
USPC ................................ 426/241–243, 505, 523; 220/573.1–573.5
See application file for complete search history.

(56) References Cited

U.S. PATENT DOCUMENTS

| | | | | |
|---|---|---|---|---|
| 2,190,201 A | * | 2/1940 | Ward | 126/376.1 |
| 3,078,006 A | * | 2/1963 | Price et al. | 220/573.2 |
| 4,164,643 A | | 8/1979 | Peart et al. | |
| 4,256,546 A | * | 3/1981 | Brugger | 205/173 |
| 4,455,319 A | * | 6/1984 | Clark | 426/233 |
| 4,781,169 A | * | 11/1988 | Henke et al. | 126/21 A |
| 4,839,502 A | * | 6/1989 | Swanson et al. | 219/401 |
| 4,880,952 A | * | 11/1989 | Hirai et al. | 219/685 |
| 4,881,519 A | * | 11/1989 | Henke | 126/21 A |
| 5,676,043 A | * | 10/1997 | Best | 126/39 B |
| 6,229,117 B1 | | 5/2001 | Lenahan | |
| 6,818,869 B2 | * | 11/2004 | Patti et al. | 219/489 |
| 6,921,431 B2 | | 7/2005 | Evans et al. | |
| 7,105,047 B2 | * | 9/2006 | Simmons et al. | 106/600 |
| 8,636,946 B1 | | 1/2014 | Olver | |
| 8,693,853 B2 | | 4/2014 | Olver | |
| 2008/0245359 A1 | * | 10/2008 | Williamson | 126/39 C |
| 2009/0252660 A1 | | 10/2009 | Olver et al. | |
| 2009/0272728 A1 | * | 11/2009 | Abbott | 219/399 |
| 2009/0293786 A1 | | 12/2009 | Olver | |
| 2010/0006559 A1 | * | 1/2010 | Distaso et al. | 219/408 |
| 2010/0038061 A1 | | 2/2010 | Olver et al. | |
| 2010/0041927 A1 | | 2/2010 | Olver et al. | |
| 2010/0081100 A1 | * | 4/2010 | Olver et al. | 431/159 |

* cited by examiner

*Primary Examiner* — Drew Becker
(74) *Attorney, Agent, or Firm* — Johnston Holroyd; Mary-Jacq Holroyd

(57) ABSTRACT

Provide an oven and optional cooking accessories having a high emissivity thermal protective layer on a substrate surface which comprises a metal or ceramic. The layer comprises from about 5% to 30% of an inorganic adhesive, from about 45% to 92% of at least one filler, and from about 1% to 25% of one or more emissivity agents; or from about 5% to 35% of colloidal silica, colloidal alumina, or combinations thereof, from about 23% to 79% of at least one filler, and from about 1% to 25% of one or more emissivity agents.

15 Claims, 10 Drawing Sheets

FOOD PRODUCT AND METHOD AND APPARATUS FOR BAKING

BACKGROUND OF THE INVENTION

Ovens, and food products prepared in ovens, have been known for thousands of years. Baking food products including bread has also existed for thousands of years. Many different kinds of ovens for cooking and baking exist. Domestic ovens include conventional and convection ovens, and smaller appliances such as toaster ovens, and the like. Ovens for commercial use include those used in restaurants and those used in widespread commercial food production. Ovens for restaurants include revolving ovens, rack ovens, convection ovens, multiple deck ovens, pizza ovens, steam tube ovens, and the like. Ovens for commercial food production include direct fired tunnel ovens, steel band ovens, steel plate ovens, pita ovens, direct fired tray ovens, indirect fired tunnel ovens, and impingement ovens, and the like. All of these ovens are well known in the art, and have many advantages for their particular consumer or commercial applications. Ovens are heated directly or indirectly. Heat sources can be gas, oil, electric or other combustible materials. The heat in an oven may be generated electrically, or by using combustible fluids. The walls of commercial cooking ovens are typically metal but may be coated/layered with reflective or refractive materials, including nonstick layers and porcelain.

In all cases, satisfactory baker's ovens are difficult to produce. 'Hot spots' and 'cold spots' are created throughout the internal cooking region of most ovens, whether consumer or commercial, resulting in uneven application of heat to the baked products and reduced production. Numerous efforts have been made to eliminate this problem in commercial applications by providing rotary supports, belts, and rollers which continually move cooking products relative to the heating elements. Furthermore, efforts have been made to eliminate the problem of uneven heating, coupled with the preheating troubles and oven cleaning, in consumer ovens by varying the materials used in the walls of the ovens, and by the use of targeted temperature monitoring with controllers designed to actively adjust the thermal properties within the oven. Similar active controllers may be used in commercial applications as well. Nevertheless, the problems of uneven heat within the cooking region of traditional ovens, both commercial and consumer, remain. Inevitably some of the baked products produced in most ovens are unevenly cooked, and in commercial applications, this can result in unevenly cooked products and/or product loss from under or over cooking.

Ovens providing consistent heat throughout the internal cooking region or zones are desirable. It is desirable to provide a uniformly heated cooking region to minimize the amount of prepared food product that must be discarded. Numerous efforts have been used in the past to attempt to address this issue.

The effect of the emissivity of surfaces within ovens have been known to effect the cooking process. U.S. Patent Application No. 2010/006,559 teaches a consumer oven having an element with different coatings on the element having varying emissivity characteristics, optionally including a ceramic coating, designed to facilitate baking on one side, and broiling on the other.

The use of cooking pans, especially involving microwave cooking containers, having desirable emissivity characteristics are known in the prior art. Typically such inventions have involved simple dark paint, surface carbonizing, porcelain, or ceramic surfaces. As an example, U.S. Pat. No. 3,078,006 issued on Feb. 19, 1963 discloses a silicone resin coated metallic bake form having nonstick properties and improved radiant heat absorption characteristics in which small amounts of carbon are incorporated into the silicone resin coating. In spite of business' efforts, a sheet of cookies baked in present ovens regardless of the pan used usually result in some cookies being more cooked then others depending on their position within the cooking region.

Efforts to control the thermal environment within an oven during baking, and pans having desired thermal characteristics, are known. It is also known to provide ovens that operate, in part, by having cooking zones. The walls of some ovens have been coated in ceramic, porcelain, aluminum, dark paint, and the like in an effort to produce a desirable temperature within the cooking region or to facilitate cleaning of the sides of the oven. Other ovens simply have exposed metal surfaces.

Similarly, cooking pans have been modified to produce desirable thermal characteristics and to facilitate cleaning of the cooking surface of the pan. Simple metal racks, metal rollers, and metal conveyor belts are typically used in commercial ovens equipped with either racks, rollers, belts, or the like.

U.S. Pat. No. 6,818,869 issued on Nov. 16, 2004 teaches a multiple panel, or deck, oven having individual controls for combine conductive and radiant heating panels, and providing the option of having 1-5 different cooking zones between various panels.

U.S. Pat. No. 6,229,117 issued on May 8, 2001 teaches a bread refreshing oven having an interior lining of the oven is rebounded fused silica foam, and a tray made of fused silica in the form of a non-porous ceramic is used with the oven.

U.S. Pat. No. 4,164,643, issued on Aug. 14, 1979, teaches an energy-efficient bi-radiant oven system in which a black coated aluminum pan is disclosed with an emissivity of $E=0.79$; however, the oven used in this system has an oven lining with a highly reflective metal and an emissivity value on the order of $E=0.05$.

Energy efficient ovens with even heat distribution remain desirable. Food loss due to uneven and unpredictable oven performance remains a problem. It is desirable to have an oven which will heat evenly within a cooking zone to reliably and consistently produce the same cooked food products for mass distribution.

SUMMARY OF THE INVENTION

The present design relates to food products and a method and apparatuses for cooking and especially baking food products. Specifically, the present design relates to a method or process of cooking food products in an oven having a high emissivity thermal protective layer disposed on metallic and ceramic internal surfaces thereof, ovens having a high emissivity thermal protective layer disposed on the metallic internal surfaces thereof, and food products produced thereby.

An oven according to the present design has a housing including a ceiling, floor, two opposite side walls and an opening therethrough forming at least one internal heating zone. A conventional heating means is provided to heat the zone, and may include gas or oil burners, electric resistance coils, steam tubes, and the like. At least one substrate surface is provided, within the oven adjacent the heating zone, including the ceiling, floor, walls, heating means, panel, door, and the like, have a high emissivity thermal protective layer disposed thereon.

The high emissivity thermal protective layer for metal surfaces has from about 5% to about 30% of an inorganic adhesive, from about 45% to about 92% of at least one filler, and from about 1% to about 25% of one or more emissivity agents. The high emissivity thermal protective layer for ceramic surfaces has from about 5% to about 35% of colloidal silica, colloidal alumina, or combinations thereof, from about 23% to about 79% of a filler, and from about 1% to about 25% of one or more emissivity agents.

Oven cooking accessories used in the process for making the cooked product according to the present design, and include pans, cooking sheets, racks, and the like. The cooking accessories have a cooking surface for coming into contact with food and an outside surface opposite the cooking surface having a high emissivity thermal protective layer disposed on the outside surface thereof. Alternative embodiments permit the high emissivity thermal protective layer to be disposed on the entire external surface thereof, including both the outside and the cooking surfaces. A nonstick layer, or other layer, as is well known in the art may be disposed on the cooking surface. The thermal protective layer may be disposed between the cooking surface and the nonstick layer, or other layer.

A process of making a food product, and the food products made therein, are encompassed by the present design. The process for making the food product takes less time and requires less energy than the conventional process without the high emissivity thermal layer disposed on substrate surfaces within the oven. Food products made in the oven of the present design and by the process of the present design are more uniform both in terms of subsequent batches and in terms of food product in different parts of the oven.

An aspect of the present design is ovens having at least one uniform heating region, or zone, for evenly cooking a food product therein. Alternative embodiments of the present design may provide for multiple heating zones. Examples of commercial ovens having heating multiple zones include tunnel ovens which are either directly or indirectly fired but provide for multiple zones through which the food product travels. Another example may be provided with some rack, deck, tray, revolving, or pizza ovens which may provide separate heating zones as shelves including directly heating each shelf.

Another aspect of the present design is to provide a prepared food product cooked in an oven containing a high emissivity coating according to the present design disposed on the internal metallic surfaces thereof to provide consistently even heat throughout each heating region and zone thereof. The resultant food products produced by the present design are more uniform in size, shape, and extent cooked. Multiple batches are also more uniform. Ovens according to the present design provide a significantly more uniform cooking environment than other ovens lacking the thermal protective layer disposed thereon resulting in substantially uniform baked products.

Yet another aspect of the present design is to provide a cooking pan having a high emissivity thermal protective layer according to the present design disposed on the outside of an otherwise conventional cooking pan. Food products prepared in such pans are significantly more uniform in their size, shape, and extent cooked then food products prepared in conventional pans. The high emissivity thermal protective layer functions to even out the temperature and thermal heat signature increasing the uniformity of the heat within the ovens of the present design.

A further aspect of the present design is to provide a food product which is uniform in size and shape because of the uniform thermal environment within the oven. Food products prepared in such pans and ovens are substantially uniform in their size, shape, and extent cooked then food products prepared in conventional ovens and pans. The present design improves the wavelength distribution in the infrared cooking/baking wavelengths.

An aspect of the present design is to provide a high emissivity thermal protective layer disposed on the internal surfaces of an oven to produce a cooking environment in which the food product cooked or baked within the oven is uniformly heated at the optimum temperature. The emissivity layer results in the reduction of baking time yielding in increased baking capacity and/or the reduction of energy need to bake grain base products.

Yet another aspect of the present design is to provide a method of and apparatus for baking food products, and food products baked thereby, in which substantially all of the food products prepared from the same volume of a recipe are uniform in size and shape, and that are consistent through different runs over extended periods of time. It is essential for mass food production to be essentially uniform. The present design furthers this goal.

These and other aspects of the present design will become readily apparent upon further review of the following drawings and specification.

BRIEF DESCRIPTION OF THE DRAWINGS

The novel features of the described embodiments are specifically set forth in the appended claims; however, embodiments relating to the structure and process of making the present design, may best be understood with reference to the following description and accompanying drawings.

Similar reference characters denote corresponding features consistently throughout the attached drawings.

DETAILED DESCRIPTION OF PREFERRED EMBODIMENTS

Figure 18:
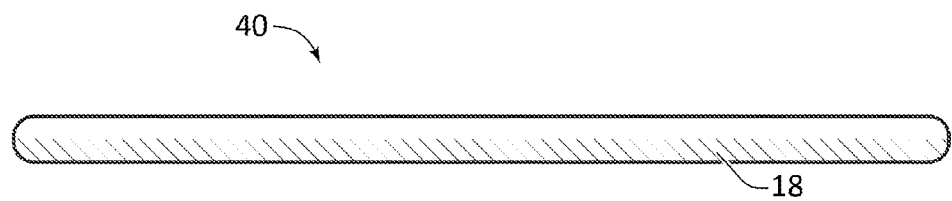
FIG. 18 is an environmental view of a panel according to an alternative design.
Figure 19:
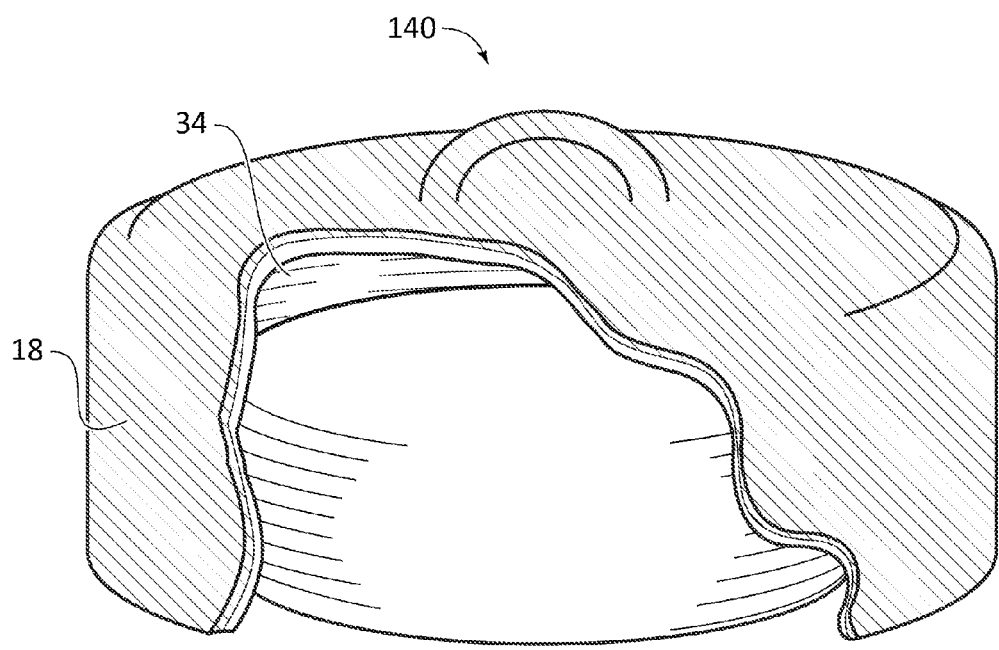
FIG. 19 is an environmental view of an insert according to yet another alternative design.

An oven 12 according to the present design, as shown in FIGS. 1-10, has a housing 14 including a ceiling 16, floor 20, two opposite side walls 15 and 17, and an opening 21 therethrough forming at least one internal heating zone 34. A conventional heating means 38 may include conventional gas burners, coils, steam tubes, and the like, which heating means 38 may have a high emissivity thermal protective layer 18 disposed thereon. At least one substrate surface is provided including the ceiling 16, floor 20, walls 15 and 17, heating means 38, panel 40, door 42, and the like, have a high emissivity thermal protective layer 18 disposed thereon. The panel 40 may be placed in the oven to protect the walls 15 and 17, the back wall 23, the ceiling 16, or the floor 20, and may be either ceramic or metal. The heating means 38 may be a direct fired burner, an indirect fired burner, or direct or indirect heating electric elements. FIGS. 18 and 19 show cooking accessories that may be used in conventional ovens, and include a panel 40 which may be used alone or if more than one panel 40. Another alternative is shown that has an insert 140 with a high emissivity thermal protective layer 18 thereon either the inside or outside surfaces thereof according to yet another alternative design with a heat zone 34 encompassed therein.

The high emissivity thermal protective layer 18 for metal surfaces has from about 5% to about 30% of an inorganic adhesive, from about 45% to about 92% of at least one filler, and from about 1% to about 25% of one or more emissivity agents. The high emissivity thermal protective layer 18 for ceramic surfaces has from about 5% to about 35% of colloidal silica, colloidal alumina, or combinations thereof, from about 23% to about 79% of at least one filler, and from about 1% to about 25% of one or more emissivity agents.

Figure 1:
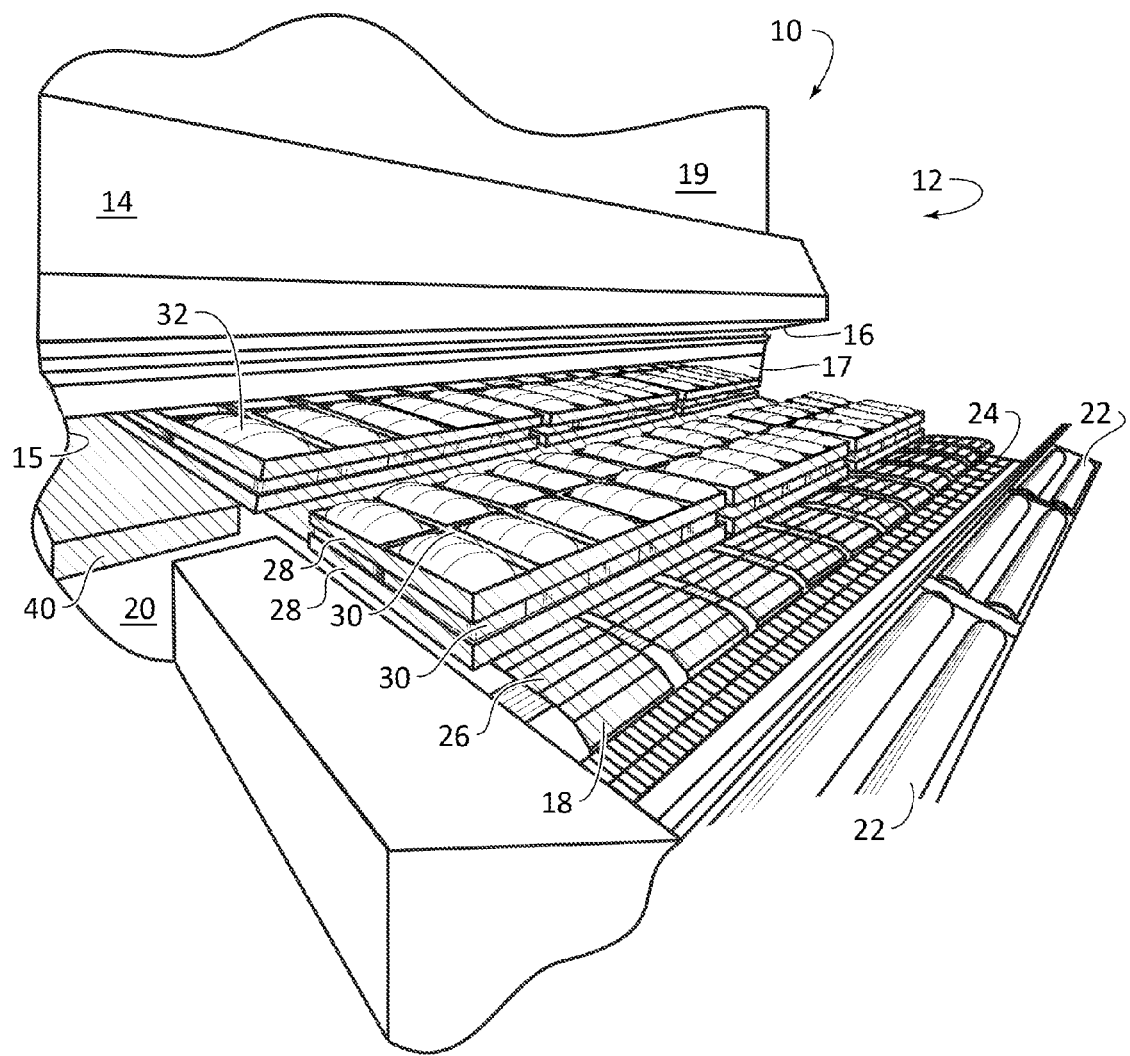
FIG. 1 is a breakaway environmental view of a direct fired tunnel oven showing the inside of the tunnel oven, and oven accessories, having a high emissivity thermal protective layer disposed thereon according to an alternative embodiment of the present design.

The present design encompasses any cooking oven having a high emissivity thermal protective layer 18 according to alternative embodiments of the present design. FIG. 1 shows a direct fired tunnel oven which is a type of oven 12 that has multiple heating zones 34; and a conveyor system 22, 24, and 26. The conveyor system 22, 24, and 26 comprises rollers 22 or belts 24 to move racks 28 containing cooking pans 30 therein through each hating zone 34. A high emissivity thermal protective layer may be disposed at least partially on the conveyor system 22, 24, and 26, rollers 22, belts 24, or racks 28, or combinations thereof.

Figure 2A:
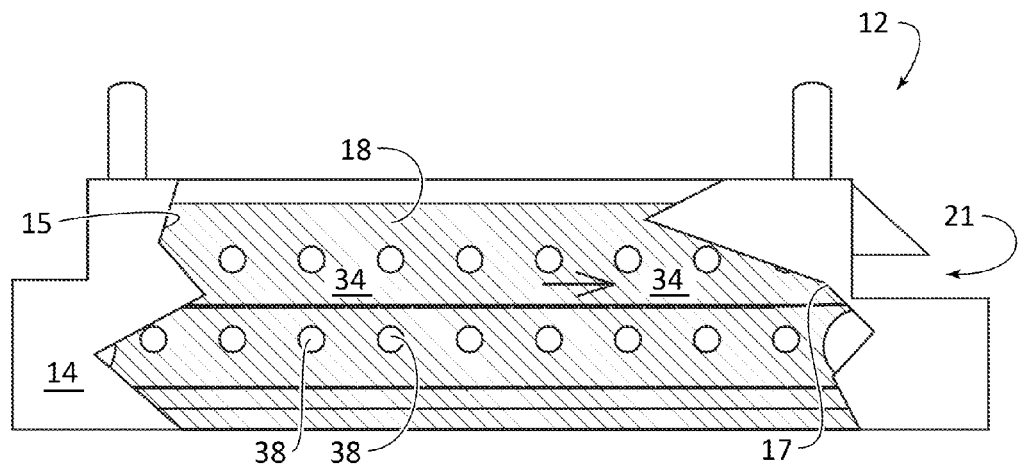
FIG. 2A is a diagrammatic view of a direct fired tunnel oven using a conveyor belt system and having a high emissivity thermal protective layer disposed thereon according to alternative embodiments of the present design.
Figure 2B:
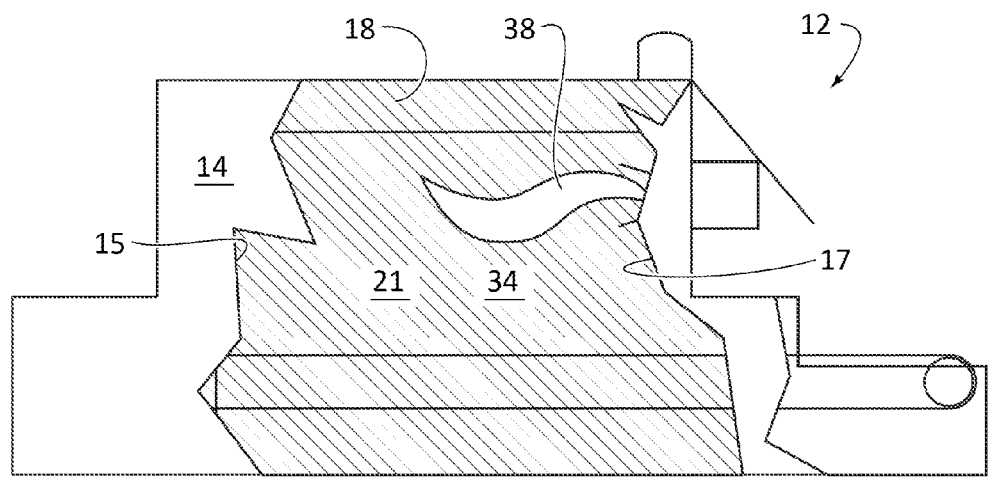
FIG. 2B is a diagrammatic view of an indirect fired tunnel oven using a conveyor belt system according to an alternative embodiment of the present design having high emissivity thermal protective layer therein.
Figure 3:
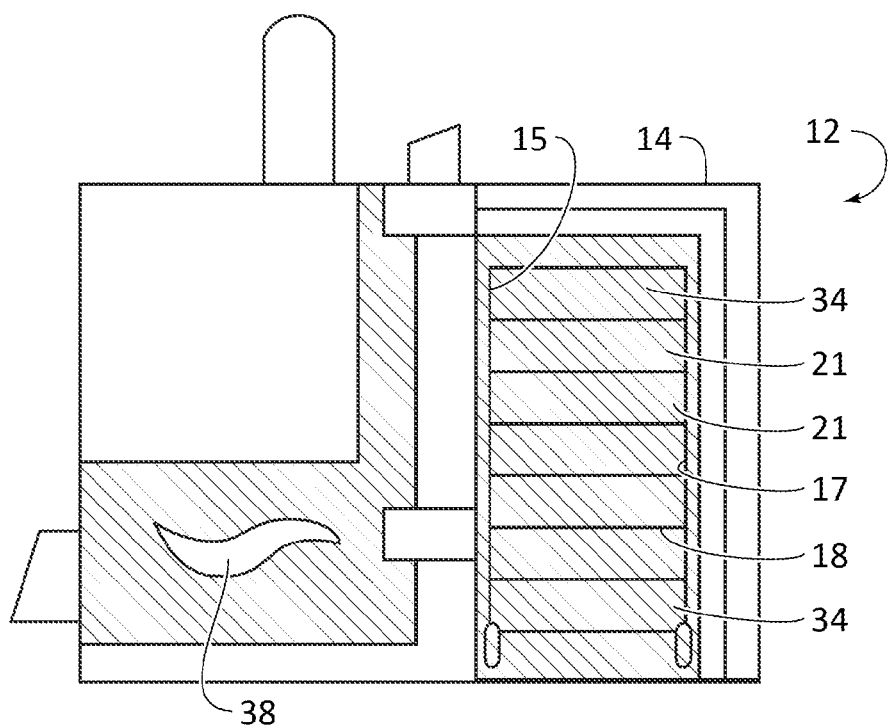
FIG. 3 is a diagrammatic view of a rack oven according to yet another alternative embodiment of the present design having a high emissivity thermal protective layer therein.
Figure 4:
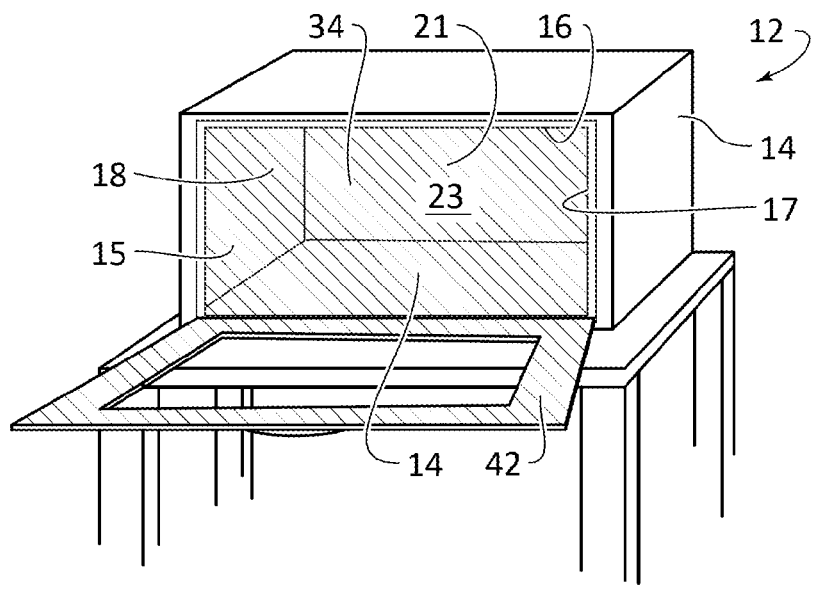
FIG. 4 is a diagrammatic view of a convection oven with a high emissivity thermal protective layer therein according to an alternative embodiment of the present design.
Figure 5:
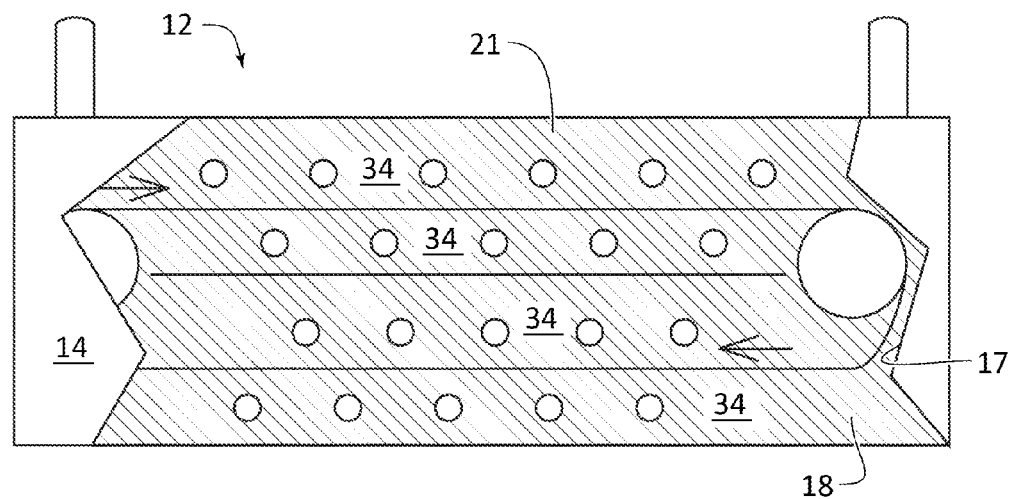
FIG. 5 is a diagrammatic view of a direct fired tray oven with a high emissivity thermal protective layer therein according to an alternative embodiment of the present design.
Figure 6:
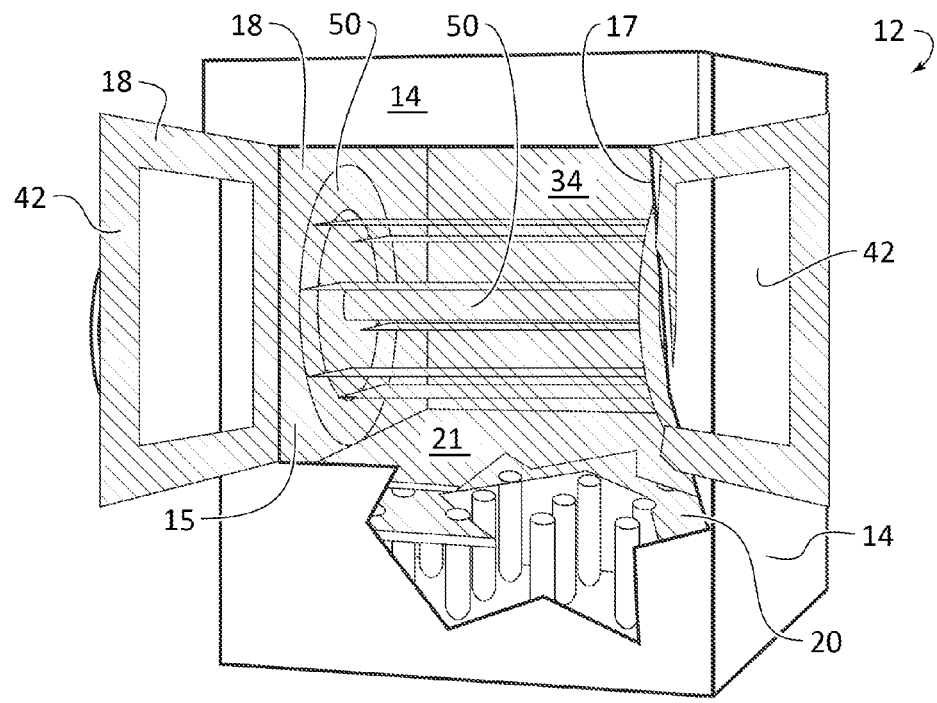
FIG. 6 is a perspective view of a revolving oven according to an alternative embodiment of the present design having a high emissivity thermal protective layer therein.
Figure 7:
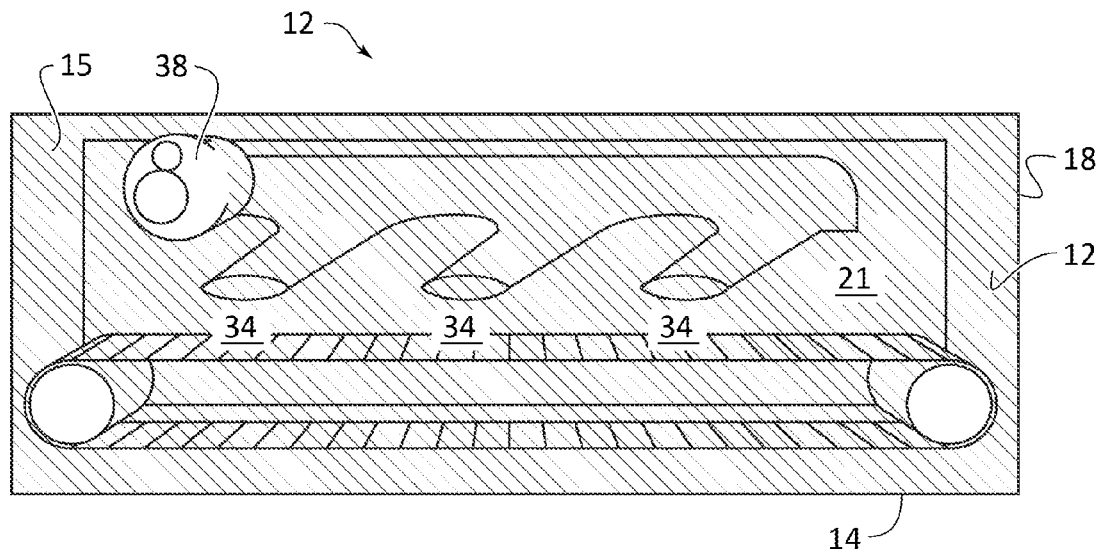
FIG. 7 is a diagrammatic view of an impingement oven with a high emissivity thermal protective layer therein according to an alternative embodiment of the present design.
Figure 8:
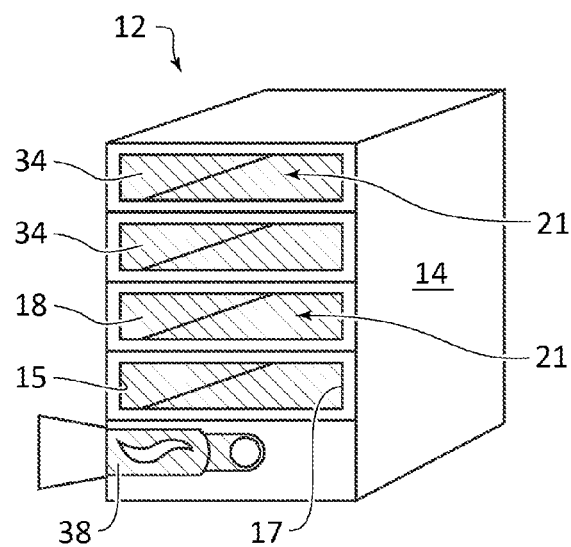
FIG. 8 is a diagrammatic view of a multiple deck oven according to an embodiment of the present design with a high emissivity thermal protective layer therein.
Figure 9:
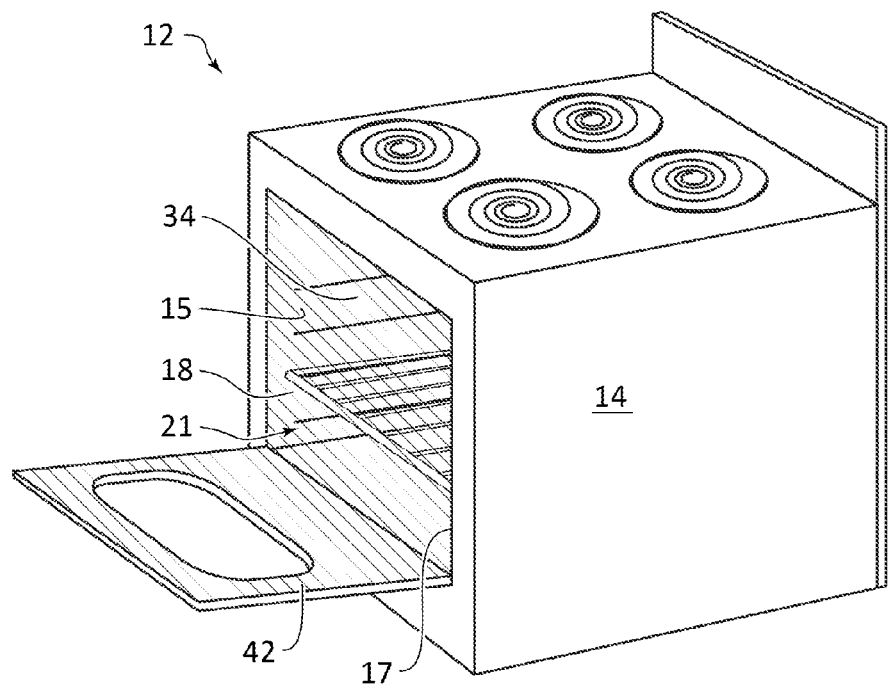
FIG. 9 is an environmental side view of a conventional consumer oven according to an embodiment thereof with a high emissivity thermal protective layer therein.
Figure 10:
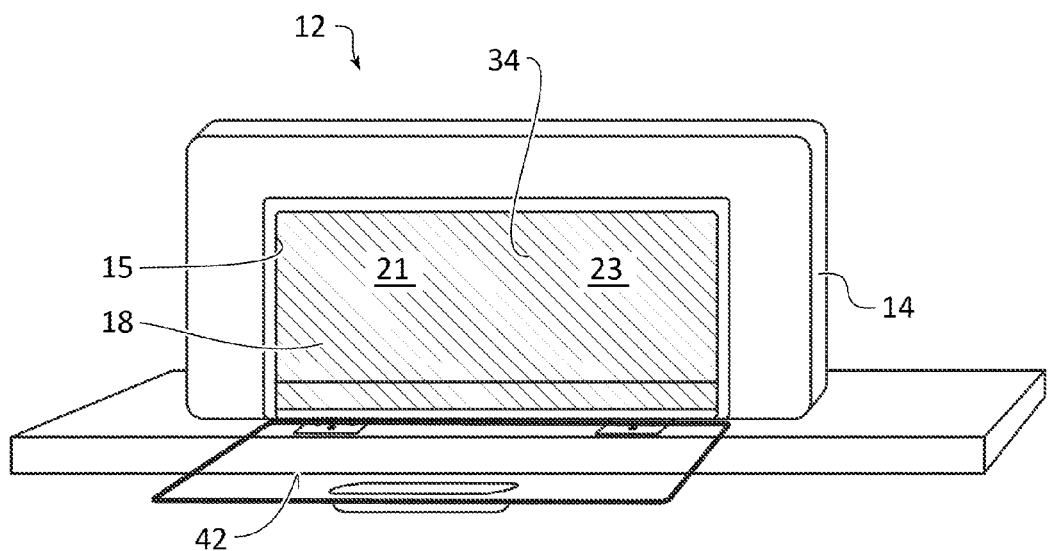
FIG. 10 is a diagrammatic view of a consumer toaster oven with a high emissivity thermal protective layer therein according to an alternative view of the present design.

FIG. 2A shows direct fired tunnel oven 12 using a conveyor belt system 22, 24, and 26, and having a high emissivity thermal protective layer 18 disposed therein. FIG. 2B shows an indirect fired tunnel oven 12 using a conveyor belt system 22, 24, and 26, similar to the direct fired tunnel oven 12, with a high emissivity thermal protective layer 18 disposed therein. Indirect and direct fired tunnel ovens 12 can have multiple heating zones 34 to facilitate cooking the food product in the most optimum fashion. Each heating zone 34 may have a different temperature as appropriate. FIG. 3 shows a rack oven which may have separate heating zones 34 between each rack which may have a high emissivity thermal protective layer 18 disposed on the rack as well as the walls, ceiling, and floor. FIG. 4 shows a convection oven with a high emissivity thermal protective layer 18 disposed therein, and also on the door 42. FIG. 5 shows a direct fired tray oven which may have multiple heating zones 34 therein in the same manner as a tunnel oven. Indirect fired tray ovens are also known. FIG. 6 shows a revolving oven which has doors 42 and a rotating rack system 50 with a high emissivity thermal protective layer 18. FIG. 7 shows an impingement oven that may also have multiple heating zones 34 therein as well. FIG. 8 shows a multiple deck oven that may have a heating zone 34 within each deck. FIG. 9 shows a conventional consumer oven, and FIG. 10 shows a consumer toaster oven.

Figure 11A:
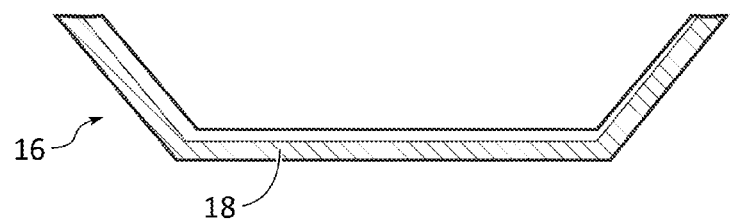
FIG. 11A is a side view of a burner shield according to an alternative embodiment of the present design with a high emissivity thermal protective layer thereon.
Figure 11B:
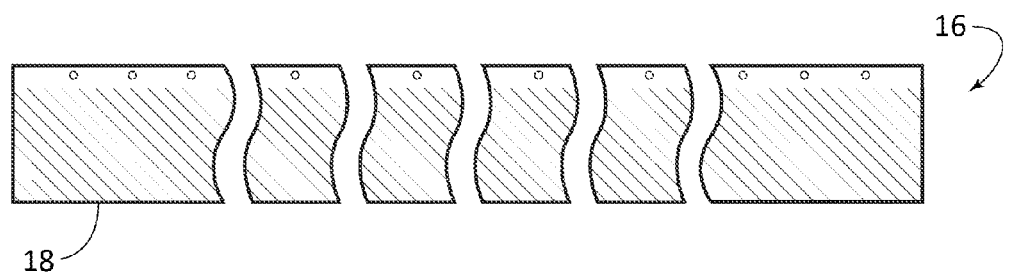
FIG. 11B is a top view of a burner shield according to an embodiment of the present design with a high emissivity thermal protective layer thereon.
Figure 11C:
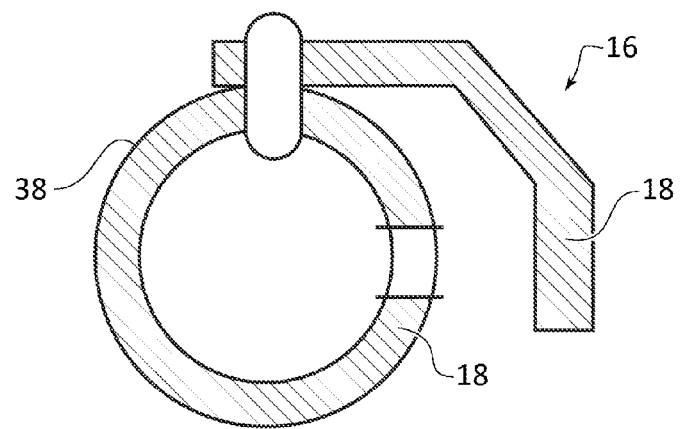
FIG. 11C is a side view of a burner shield and burner assembly according to the present design with a high emissivity thermal protective layer thereon.
Figure 12:
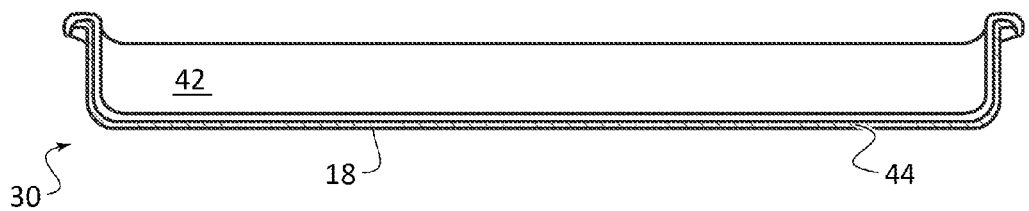
FIG. 12 is a side cutaway view of a cake pan according to an alternative embodiment of the present design with a high emissivity thermal protective layer.
Figure 13:
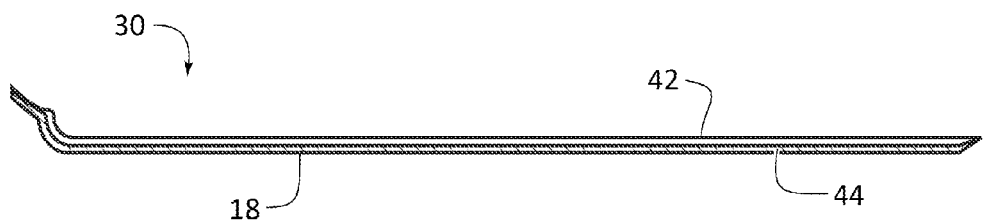
FIG. 13 is a partial side cutaway view of a cookie sheet according to an alternative embodiment of the present design with a high emissivity thermal protective layer.
Figure 14:
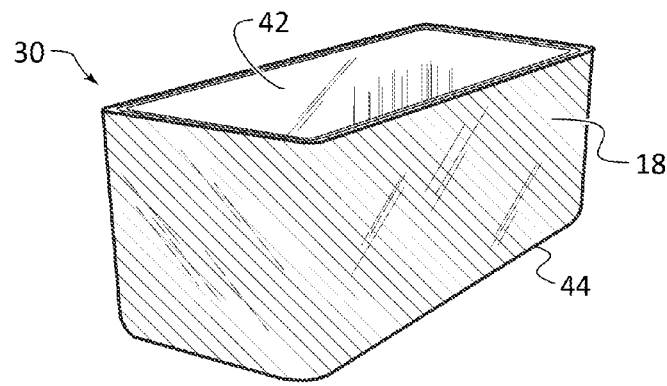
FIG. 14 is an elevated environmental view of a loaf pan according to an embodiment of the present design with a high emissivity thermal protective layer.
Figure 15:
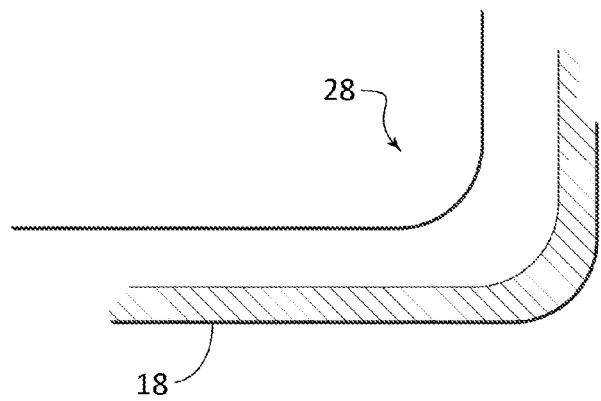
FIG. 15 is a cutaway view of a rack according to the present design showing the high emissivity thermal protective layer disposed on the outer surface thereof.
Figure 16:
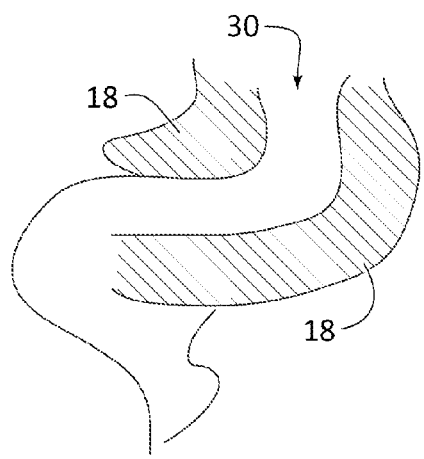
FIG. 16 is a side view of a cooking accessory having a high emissivity thermal protective coating disposed on the cooking surface and on the outside surface.

An alternative to a conventional burners and burner shields is shown in FIGS. 11A-11C. FIGS. 11A and 11B show a burner shield 16 which directs the heat radiation as it is emitted from the burner 38. Either or both the burner 38 and/or the burner shield 16 may have a high emissivity thermal protective layer 18 disposed thereon. Burner shields 16 with the high emissivity thermal protective layer 18 thereon function superior to the same burner shield 16 without the layer 18 thereon. It is to be understood that the layer 18 may be disposed on either side of a surface and will depart the desired characteristics to the coated material.

Figure 17:
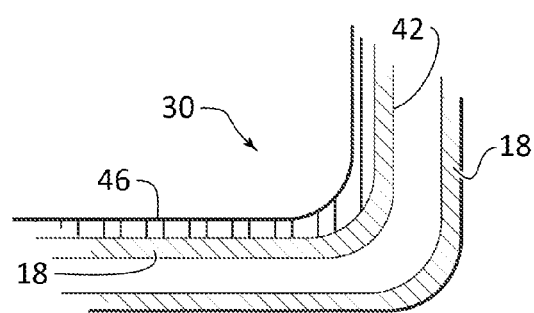
FIG. 17 is a side view of a cooking accessory according to the present design having a high emissivity thermal protective layer disposed between the cooking surface and a nonstick surface layer.

Oven cooking accessories shown in FIGS. 12-17, including pans 30, cooking sheets 30, racks 28, and the like, have a cooking surface 42 for coming into contact with food and an outside surface 44 opposite the inside surface 42 having a high emissivity thermal protective layer 18 disposed on the outside surface 44 thereof. Alternative embodiments permit the high emissivity thermal protective layer 18 disposed on the entire external surface 42 and 44 thereof including the outside surface 44 and the cooking surface 42. A nonstick layer 46, as shown in FIG. 17, or other layer as is well known in the art may be disposed on the cooking surface 42. The thermal protective layer may be disposed between the cooking surface 42 and the nonstick layer 46. The cooking accessories may be composed of metals, fiber, or silicone rubber, and may or may not have an emissivity shield disposed thereon, or disposed in layers thereof.

A process of making a food product and the food product made therein are encompassed by the present design. The process for making the food product takes less time and requires less energy than the conventional product without the high emissivity thermal layer disposed on substrate surfaces within the oven. Food products made in the oven of the present design and by the process of the present design are more uniform both in terms of subsequent batches and in terms of food product in different parts of the oven.

Substrate surfaces include the oven walls, ceilings, floor, door, racks, radiant tubes, steam tubes, tube shields, reflectors, heating elements, burners, burner shields, panels, inserts, rollers, conveyor belts, oven frames, and the like, including all exposed metallic surfaces within an oven. Substrate surfaces also include apparatuses used within the oven but removable from the oven including racks, cooking pans, baking sheets, and any surface of carrier rack pans. Commercial ovens encompassed by the present design include, but are not limited to, direct and indirect heated tunnel ovens, multi deck ovens, steam tube ovens, impingement ovens, hybrid ovens, and consumer ovens. Consumer ovens encompassed by the present design, include but are not limited to conventional ovens, whether gas fired or electric, convection ovens, toaster oven, bread machines, toasters, and the like. Multiple deck ovens encompassed by the present design, whether electric or gas fired, conventional or convection, include pizza ovens, steam tube ovens, rack, rotating rack, deck ovens, modular ovens, and the like. Panels and inserts are metal or ceramic accessories that can be placed in an oven in lieu of coating the oven with a high emissivity thermal protective layer. The Panels may be flat with two sides, inside and outside. Alternatively inserts which are cap-like with an opening within to form a heat zone may be used. An insert may have a ceiling and sides just like the oven, with an opening therein forming the heat zone. The item to be cooked is placed within the opening either through a side, or by having the insert placed on top of the food to be cooked.

Cooking accessories that come into direct contact with food may also have a high emissivity thermal protective layer 18 according to the present design disposed on the surfaces thereof, or integrated within the multiple layers. It is most desirable to have a high emissivity layer disposed on the bottom surfaces of pans, sheets, and racks. An alternative also permits the high emissivity layer to be disposed on both, top and bottom, sides. In some alternative embodiments of the present design, ovens and cooking accessories may have non-stick layers, or other layered configurations, with the high emissivity layer disposed either under or on top of the non-stick layer. Alternatively, panels having a high emissivity layer disposed thereon may be placed within the oven. Alternatively, the oven may have a hearth that the cooked product sits directly on including wire mesh belts, steel plate, hinge plate, stone plates, ceramic plates, and manmade composite cement plates.

Metal and alloy substrate surfaces are found in most ovens, and include most surfaces including walls, ceilings, floors, doors, racks, steam tubes, tube shields, ducts, heat exchangers, catalytic plates, reflectors, burners, burner shields, panels, rollers, conveyors belts, and the like. Ceramic materials may be used in ovens for heating elements, shields, reflectors, radiant tubes, team tubes, and the like, and may also be used in oven walls, ceilings, floors, and the like, and parts thereof.

The ovens covered by the present design may be fueled by gas (including natural, propane, LPG, butane, and city gas), oil (including No. 2 fuel oil, bunker fuel, diesel, coal oil, and naphtha), coal, wood, biomass, fuel cell, ethanol, and electricity.

Food products include bread, buns, rolls, bagels, cakes, and the like. Breads include white breads, whole grain breads, specialty breads, highly fermented breads, hearth breads, and pan breads. Specialty breads include chaibatta breads, pita bread, and flat bread. Buns include white buns, whole grain buns, specialty buns, highly fermented buns, hearth buns, and pan buns. Rolls include specialty rolls, whole grain rolls, Kaiser rolls, split top rolls, cross rolls, water rolls, bulky rolls, sub rolls, grinder rolls, torpedo rolls, and the like, both pan and hearth baked. Bagels, bialys, and bagel twists are included, as well. Sweets include cakes, pies, pastries, cookies, crackers, and sweet goods. All grain based products including gluten and gluten free products are included.

The thermal protective layer 18 for metallic substrates comprises from about 5% to about 30% of an inorganic adhesive, from about 45% to about 92% of at least one filler, and from about 1% to about 25% of one or more emissivity agents; or for ceramic substrates comprises from about 5% to about 35% of colloidal silica, colloidal alumina, or combinations thereof, from about 23% to about 79% of a filler, and from about 1% to about 25% of one or more emissivity agents.

The high emissivity thermal protective layer 18 may be applied as a high emissivity multifunctional thermal protective coating. Alternative suitable coatings and methods of application are described in U.S. Pat. Nos. 7,105,047 and 6,921,431, the contents of which are incorporated herein in their entirety.

A high emissivity coating suitable for forming a thermal protective layer on a metal/alloy substrate surface of the present design may contain from about 5% to about 30% of an inorganic adhesive, from about 45% to about 92% of at least one filler, and from about 1% to about 25% of one or more emissivity agents, in a dry admixture. Preferably, the dry admixture also contains from about 1% to about 5% of a stabilizer.

An alternative high emissivity coating suitable for forming a thermal protective layer on a ceramic surface within a cooking oven according to alternative embodiments of the present design may contain from about 5% to about 35% of colloidal silica, from about 23% to about 79% of at least one filler, from about 1% to about 25% of one or more emissivity agents. Preferably, a thermal protective layer of the present design also contains from about 1.5% to about 5.0% of a stabilizer.

As used herein, all percentages (%) are percent weight-to-weight, also expressed as weight/weight %, % (w/w), w/w, w/w % or simply %, unless otherwise indicated. Also, as used herein, the terms "wet admixture" refers to relative percentages of the composition of the thermal protective coating in solution and "dry admixture" refers to the relative percentages of the composition of the dry thermal protective coating mixture prior to the addition of water. In other words, the dry admixture percentages are those present without taking water into account. Wet admixture refers to the admixture in solution (with water). "Wet weight percentage" is the weight in a wet admixture, and "dry weight percentage" is the weight in a dry admixture without regard to the wet weight percentages. The term "total solids", as used herein, refers to the total sum of the silica/alumina and the alkali or ammonia ($NH_3$), plus the fraction of all solids including impurities. Weight of the solid component divided by the total mass of the entire solution, times one hundred, yields the percentage of "total solids".

Method of preparation of coating involves applying a wet admixture of the coating to the surface to be coated. Alternative methods may include spraying the wet admixture on the surface or atomizing the dry admixture and coating the surface accordingly.

In a coating solution according to the present design, a wet admixture of the thermal protective coating, to be applied to metal/alloy substrate surfaces within a cooking oven, contains from about 6% to about 40% of an inorganic adhesive, from about 23% to about 46% of a filler, from about 0.5% to about 10% of one or more emissivity agents, and from about 18% to about 50% water. In order to extend the shelf life of the coating solution, from about 0.5% to about 2.5% of a stabilizer is preferably added to the wet admixture. The wet admixture coating solution contains between about 40% and about 60% total solids.

In a coating solution according to the present design, a wet admixture of an alternative thermal protective coating, to be applied to ceramic substrate surfaces, contains from about 15% to about 45% of colloidal silica, from about 23% to about 55% of at least one filler, from about 0.5% to about 15% of one or more emissivity agents, from about 0.5% to about 2.5% of a stabilizer and from about 18% to about 40% water. The wet admixture coating solution contains between about 40% and about 70% total solids.

The inorganic adhesive is preferably an alkali/alkaline earth metal silicate taken from the group consisting of sodium silicate, potassium silicate, calcium silicate, and magnesium silicate, and polysilicate. The colloidal silica is preferably a mono-dispersed distribution of colloidal silica, and therefore, has a very narrow range of particle sizes. The filler is preferably a metal oxide taken from the group consisting of silicon dioxide, aluminum oxide, titanium dioxide, magnesium oxide, calcium oxide and boron oxide. The emissivity agent (s) is preferably taken from the group consisting of silicon hexaboride, carbon tetraboride, silicon tetraboride, silicon carbide, molybdenum disilicide, tungsten disilicide, zirconium diboride, cupric chromite, and metallic oxides such as iron oxides, magnesium oxides, manganese oxides, copper chromium oxides, and chromium oxides, cerium oxides, and terbium oxides, and derivatives thereof. The copper chromium oxide, as used in the present design, is a mixture of cupric chromite and cupric oxide. The stabilizer may be taken from the group consisting of bentonite, kaolin, magnesium alumina silica clay, tabular alumina and stabilized zirconium oxide. The stabilizer is preferably bentonite. Other ball clay stabilizers may be substituted herein as a stabilizer. Colloidal alumina, in addition to or instead of colloidal silica, may also be included in the admixture of the present design. When colloidal alumina and colloidal silica are mixed together one or the other requires surface modification to facilitate mixing, as is known in the art.

Coloring may be added to the protective coating layer of the present design to depart coloring to the oven or oven accessories. Food safe pigments may be added to the protective coating without generating toxic fumes. In general, food safe pigments are divided into the subclasses: colored (salts and oxides), blacks, white and metallic.

A preferred embodiment of the present design contains a dry admixture of from about 10% to about 25% sodium silicate, from about 50% to about 79% silicon dioxide powder, and from about 4% to about 15% of one or more emittance agent(s) taken from the group consisting of iron oxide, boron silicide, boron carbide, silicon tetraboride, silicon carbide molybdenum disilicide, tungsten disilicide, zirconium diboride. Preferred embodiments of the thermal coating may contain from about 1.0% to about 5.0% bentonite powder in dry admixture. The corresponding coating in solution (wet admixture) for this embodiment contains from about 10.0% to about 35.0% sodium silicate, from about 25.0% to about 50.0% silicon dioxide, from about 18.0% to about 39.0% water, and from about 1.0% to about 8.5% one or more emittance agent(s). This wet admixture must be used immediately. In order to provide a coating solution admixture (wet admixture), which may be stored and used later, preferred embodiments of the thermal coating contain from about 0.25% to about 2.50% bentonite powder. Preferably deionized water is used. Preferred embodiments of the wet admixture have a total solids content ranging from about 45% to about 55%.

A preferred thermal protective coating of the present design contains a dry admixture from about 15.0% to about 20.0% sodium silicate, from about 69.0% to about 79.0% silicon dioxide powder, about 1.00% bentonite powder, and from about 5.00% to about 15.0% of an emittance agent. The emittance agent is taken from one or more of the following: iron oxide, boron silicide, molybdenum disilicide, tungsten disilicide, and boron carbide.

A most preferred wet admixture contains about 20.0% sodium silicate based on a sodium silicate solids content of about 37.45%, from about 34.5% to about 39.5% silicon dioxide powder, about 0.500% bentonite powder, and from about 2.50% to about 7.5% of an emittance agent, with the balance being water. The emittance agent is most preferably taken from the group consisting of iron oxide, boron silicide, and boron carbide (also known as, carbon tetraboride). Preferred embodiments include those where the emittance agent comprises about 2.50% iron oxide, about 2.50% to about 7.5% boron silicide, or from about 2.50% to about 7.50% boron carbide. The pH of a most preferred wet admixture according to the present design is about 11.2±1.0, the specific gravity is about 1.45±0.05 and the total solids content is about 50±0.3%.

A preferred embodiment of the present design contains a dry admixture of from about 10.0% to about 30.0% colloidal silica, from about 50% to about 79% silicon dioxide powder, and from about 2% to about 15% of one or more emittance agent(s) taken from the group consisting of cerium oxide, boron silicide, boron carbide, silicon tetraboride, silicon carbide molybdenum disilicide, tungsten disilicide, zirconium diboride, and from about 1.5% to about 5.0% bentonite powder. The corresponding coating in solution (wet admixture) for this embodiment contains from about 20.0% to about 35.0% colloidal silica, from about 25.0% to about 55.0% silicon dioxide, from about 18.0% to about 35.0% water, and from about 2.0% to about 7.5% one or more emittance agent (s), and from about 0.50% to about 2.50% bentonite powder. Preferably deionized water is used. Preferred embodiments of the wet admixture have a total solids content ranging from about 50% to about 65%.

A most preferred thermal protective coating of the present design contains a dry admixture from about 15.0% to about 25.0% colloidal silica, from about 68.0% to about 78.0% silicon dioxide powder, about 2.00% to about 4.00% bentonite powder, and from about 4.00% to about 6.00% of an emittance agent. The emittance agent is taken from one or more of the following: zirconium boride, boron silicide, and boron carbide.

A most preferred wet admixture contains about 27.0% colloidal silica based on a colloidal silica solids content of about 40%, from about 25% to about 50% silicon dioxide powder, about 1.50% bentonite powder, and from about 2.50% to about 5.50% of an emittance agent, with the balance being water. The emittance agent is most preferably taken from the group consisting of zirconium boride, boron silicide, molybdenum disilicide, tungsten disilicide, and boron carbide. Preferred embodiments include those where the emittance agent comprises about 2.50% zirconium diboride, about 2.50% boron silicide, or from about 2.50% to about 7.50% boron carbide. The specific gravity of a most preferred wet admixture is about 1.40 to 1.50 and the total solids content is about 50% to 60%.

An inorganic adhesive, which may be used in the present design, includes N (trademark) type sodium silicate that is available from the PQ Corporation (of Valley Forge, Pa.). Sodium silicates ($Na_2O \cdot XSiO_2$) are metal oxides of silica. All soluble silicates can be differentiated by their ratio, defined as the weight proportion of silica to alkali ($SiO_2/Na_2O$). Ratio determines the physical and chemical properties of the coating. The glassy nature of silicates imparts strong and rigid physical properties to dried films or coatings. Silicates air dry to a specific moisture level, according to ambient temperature and relative humidity. Heating is necessary to take these films to complete dryness—a condition in which silicates become nearly insoluble. Reaction with other materials, such as aluminum or calcium compounds, will make the film coating completely insoluble. The N (trademark) type sodium silicate, as used in the examples below, has a weight ratio $SiO_2/Na_2O$ is 3.22, 8.9% $Na_2O$, 28.7% $SiO_2$, with a density (at room temperature of 20° C.) of 41.0° Be', 11.6 lb/gal or 1.38 $g/cm^3$. The pH is 11.3 with a viscosity of 180 centipoises. The N type sodium silicate is in a state of a syrupy liquid.

The term "total solids" refers to the sum of the silica and the alkali. The weight ratio is a most important silicate variable. Ratio determines the product solubility, reactivity and physical properties. Ratio is either the weight or molar proportion of silica to alkali. Density is an expression of total solids and is typically determined using a hydrometer or pycnometer.

Ludox (trademark) TM 50 colloidal silica and Ludox (trademark) AS 40 colloidal silica are available from Grace Davidson (of Columbia, Md.). The particles in Ludox (trademark) colloidal silica are discrete uniform spheres of silica which have no internal surface area or detectable crystallinity. Most are dispersed in an alkaline medium which reacts with the silica surface to produce a negative charge. Because of the negative charge, the particles repel one another resulting in stable products. Although most grades are stable between pH 8.5-11.0, some grades are stable in the neutral pH range. Ludox (trademark) colloidal silicas are aqueous colloidal dispersions of very small silica particles. They are opalescent to milky white liquids. Because of their colloidal nature, particles of Ludox (trademark) colloidal silica have a large specific surface area which accounts for the novel properties and wide variety of uses. Ludox (trademark) colloidal silica is available in two primary families: mono-dispersed, very narrow particle size distribution of Ludox (trademark) colloidal silica and poly-dispersed, broad particle size distribution of Ludox (trademark) P. The Ludox (trademark) colloidal silica is converted to a dry solid, usually by gelation. The colloidal silica can be gelled by (1) removing water, (2) changing pH, or (3) adding a salt or water-miscible organic solvent. During drying, the hydroxyl groups on the surface of the particles condense by splitting out water to form siloxane bonds (Si—O—Si) resulting in coalescence and interbonding. Dried particles of Ludox (trademark) colloidal silica are chemically inert and heat resistant. The particles develop strong adhesive and cohesive bonds and are effective binders for all types of granular and fibrous materials, especially when use at elevated temperature is required.

Colloidal alumina is available as Nyacol (trademark) colloidal alumina, and specifically, Nyacol (trademark) AL20, available from Nyacol Nano Technologies, Inc. (Ashland, Mass.), and is available in deionized water to reduce the sodium and chlorine levels to less than 10 ppm. It contains about 20 percent by weight of $AL_2O_3$, a particle size of 50 nm, positive particle charge, pH 4.0, specific gravity of 1.19, and a viscosity of 10 cPs.

The filler may be a silicon dioxide powder such as Min-U-Sil (trademark) 5 silicon dioxide available from U.S. Silica (of Berkeley Springs, W. Va.). This silicon dioxide is fine ground silica. Chemical analysis of the Min-U-Sil (trademark) silicon dioxide indicates contents of 98.5% silicon dioxide, 0.060% iron oxide, 1.1% aluminum oxide, 0.02% titanium dioxide, 0.04% calcium oxide, 0.03% magnesium oxide, 0.03% sodium dioxide, 0.03% potassium oxide and a 0.4% loss on ignition. The typical physical properties are a compacted bulk density of 41 lbs/ft.sup.3, an uncompacted bulk density of 36 $lbs/ft^3$, a hardness of 7 Mohs, hegman of 7.5, median diameter of 1.7 microns, an oil absorption (D-1483) of 44, a pH of 6.2, 97%-5 microns, 0.005%+325 Mesh, a reflectance of 92%, a 4.2 yellowness index and a specific gravity of 2.65.

Emittance agents are available from several sources. Emissivity is the relative power of a surface to absorb and emit radiation, and the ratio of the radiant energy emitted by a surface to the radiant energy emitted by a blackbody at the same temperature. Emittance is the energy reradiated by the surface of a body per unit area.

The boron carbide, also known as carbon tetraboride, which may be used as an emissivity agent in the present design, is sold as 1000 W boron carbide and is available from Electro Abrasives (of Buffalo, N.Y.). Boron Carbide is one of the hardest man made materials available. Above 1300° C., it is even harder than diamond and cubic boron nitride. It has a four point flexural strength of 50,000 to 70,000 psi and a compressive strength of 414,000 psi, depending on density. Boron Carbide also has a low thermal conductivity (29 to 67 W/mK) and has electrical resistivity ranging from 0.1 to 10 ohm-cm. Typical chemical analysis indicates 77.5% boron, 21.5% carbon, iron 0.2% and total Boron plus Carbon is 98%. The hardness is 2800 Knoop and 9.6 Mohs, the melting point is 4262° F. (2350° C.), the oxidation temperature is 932° F. (500° C.), and the specific gravity is 2.52 g/cc.

1000 W green silicon carbide (SiC), an optional emissivity agent, is also available from Electro Abrasives. Green Silicon Carbide is an extremely hard (Knoop 2600 or Mohs 9.4) man made mineral that possesses high thermal conductivity (100 W/m-K). It also has high strength at elevated temperatures (at 1100° C., Green SiC is 7.5 times stronger than $Al_2O_3$). Green SiC has a Modulus of Elasticity of 410 GPa, with no decrease in strength up to 1600° C., and it does not melt at normal pressures but instead dissociates at 2815.5° C. Green silicon carbide is a batch composition made from silica sand and coke, and is extremely pure. The physical properties are as follows for green silicon carbide: the hardness is 2600 Knoop and 9.4 Mohs, the melting point is 4712° F. (2600° C.), and the specific gravity is 3.2 g/cc. The typical chemical analysis is 99.5% SiC, 0.2% $SiO_2$, 0.03% total Si, 0.04% total Fe, and 0.1% total C. Commercial silicon carbide and molybdenum disilicide may need to be cleaned, as is well known in the art, to eliminate flammable gas generated during production.

Boron silicide ($B_6Si$) is available from Cerac (of Milwaukee, Wis.). The boron silicide, also known as silicon hexaboride, available from Cerac has a −200 mesh, and a typical purity of about 98%. Zirconium boride ($ZrB_2$) is also available from Cerac with a typical average of 10 microns or less (−325 mesh), and a typical purity of about 99.5%.

Iron oxide available from Hoover Color (of Hiwassee, Va.) is a synthetic black iron oxide ($Fe_2O_3$) which has an iron oxide content of 60%, a specific gravity of 4.8 gm/cc, a tap density (also known as, bulk density) of 1.3 gm/cc, oil absorption of 15 lbs/100 lbs, a 325 mesh residue of 0.005, and a pH ranging from 7 to 10.

Preferably the admixture of the present design includes bentonite powder, tabular alumina, or magnesium alumina silica clay. The bentonite powder permits the present design to be prepared and used at a later date. Preparations of the present design without bentonite powder must be used immediately. The examples provided for the present design include PolarGel bentonite powder are available from Mineral and Pigment Solutions, Inc. (of South Plainfield, N.J.). Technical grade bentonite is generally used for the purpose of suspending, emulsifying and binding agents, and as Theological modifiers. The typical chemical analysis 59.00% to 61.00% of silicon dioxide ($SiO_2$), 20.00% to 22.00% of aluminum oxide ($Al_2O_3$), 2.00% to 3.00% calcium oxide (CaO), 3.50% to 4.30% magnesium oxide (MgO), 0.60% to 0.70% ferric oxide ($Fe_2O_3$), 3.50% to 4.00% sodium oxide ($Na_2O$), 0.02% to 0.03% potassium oxide ($K_2O$), and 0.10% to 0.20% titanium dioxide and a maximum of 8.0% moisture. The pH value ranges from 9.5 to 10.5. Typical physical properties are 83.0 to 87.0 dry brightness, 2.50 to 2.60 specific gravity, 20.82 pounds/solid gallon, 0.0480 gallons for one pound bulk, 24 ml minimum swelling power, maximum 2 ml gel formation, and 100.00% thru 200 mesh. Tabular alumina (Alumina Tab T64 Item 635) and magnesium alumina silica clay (Mag Alum Sil Technical Item 105) are also available from Mineral and Pigment Solutions, Inc.

Colorants, which may be added to the present design, include but are not limited to inorganic pigments. Suitable inorganic pigments, such as yellow iron oxide, chromium oxide green, red iron oxide, black iron oxide, titanium dioxide, are available from Hoover Color Corporation. Additional suitable inorganic pigments, such as copper chromite black spinel, chromium green-black hematite, nickel antimony titanium yellow rutile, manganese antimony titanium buff rutile, and cobalt chromite blue-green spinel, are available from The Shepherd Color Company (of Cincinnati, Ohio).

A surfactant and/or a dispersant may be added to the wet admixture prior to applying the thermal protective layer to the support layer. The surfactant was Surfyonol (trademark) 465 surfactant available from Air Products and Chemicals, Inc. (of Allentown, Pa.). The Surfyonol (trademark) has a chemical structure of ethoxylated 2,4,7,9-tetramethyl 5 decyn-4,7-diol. Other surfactants may be used, such as STANDAPOL (trademark) T, INCI which has a chemical structure of triethanolamine lauryl sulfate, liquid mild primary surfactant available from Cognis-Care Chemicals (of Cincinnati, Ohio). The amount of surfactant present by weight in the wet admixture in from about 0.05% to about 0.2%.

The thermal protective coating is applied to the surface to form a thermal protective layer. The substrate surface may be a metallic substrate such as iron, aluminum, alloys, steel, cast iron, stainless steel and the like, or it may be a ceramic surface, as is well known in the art. The coating is typically applied wet, and either allowed to air dry or heat dry.

Substrate surface preparations for metal, alloy, or ceramic surfaces are slightly different. The present design may be used with new ovens which will need limited surface preparation, or may be used to refit old ovens. In either case, the substrate surface should be clear of all dirt, loose material, surfactants, oils, any foreign matter, etc. A metal surface in a new or used oven may be grit blasted, if necessary. Grit blasting may be desirable to remove oxidation, other contaminants, and to improve the profile for metal surfaces only. Grits media should be sharp particles. Gun pressure will vary depending on the cut type, condition of the metal and profile desired. Old metal will require higher psi, such as up to 70-80 psi. Oil and water-free compressed air is required. Proper filters for the removal of oil and water are required. Other alkaline type metal cleansers may also be utilized. Ceramic surfaces that has been cleaned and cured is cleaned by light wire brushing and vacuuming of the surface.

After the grit blast, the surface should be thoroughly cleaned to remove all loose particles with clean oil and water free air blasts. Avoid contaminating surface with fingerprints. Acetone can be used (under proper ventilation and exercising all necessary precautions when working with acetone) on a clean cloth to wipe metallic surfaces clean. A cleaning compound may be used on certain stainless steel in lieu of grit blasting. Many alkaline metal cleaners (powdered or liquid) are known in the art and may be used provided, however, that the surface is thoroughly cleaned with no residue or particulates remaining. Ceramic surfaces do not need further cleaning, but might be cleaned using acetone where oil or the like has spilled on the surface.

When using wet admixture, solids may settle during shipment or storage. Prior to use all previously mixed coating must be thoroughly re-mixed to ensure all settled solids and clumps are completely re-dispersed. When not using a stabilizer, the coating may not be stored for any period of time. In any case, the coating should be used immediately after mixing to minimize settling.

Mixing instructions for one and five gallon containers. High speed/high shear saw tooth dispersion blade 5" diameter for one gallon containers and 7" diameter for five gallon containers may be attached to a hand drill of sufficient power with a minimum no load speed of 2000 rpm shear. Dispersion blades can be purchased from numerous suppliers. Mix at high speed to ensure complete re-dispersion for a minimum of 30 minutes.

The product should be applied directly after cleaning a metal surface so minimal surface oxidation occurs. The product should be applied in a properly ventilated and well lit area, or protective equipment should be used appropriate to the environment, for example within a firebox. The mixed product should not be filtered or diluted.

A high volume low pressure (HVLP) spray gun should be used with 20-40 psi of clean, oil and water free air. Proper filters for removal of oil and water are required. Alternatively, an airless spray gun may be used. Other types of spray equipment may be suitable. The applicator should practice spraying on scrap metal prior to spraying the actual part to ensure proper coverage density. An airless spray system is preferable for applications on ceramic surfaces such as the refractory materials. A high speed pot agitator system may be desirable for metal applications. Suitable spray gun tips may be selected to provide the proper thickness without undue experimentation.

Controlling the coverage density may be critical to coating performance. The thermal layer thickness should be from about one (1) mils (about 25 microns ($\mu$)) to about four (4) mils (about 100$\mu$), depending upon typed, size and condition of substrate. One (1) mil equals 25.4$\mu$. Proper thickness may vary. If possible, rotate the part 90 degrees at least once to maintain even coverage. Allow 1 to 4 hours of dry time before the part is handled, depending upon humidity and temperature.

Example 1 contains N grade Sodium Silicate 15.0% dry weight and 20.0% wet weight based on sodium silicate solids content of 37.45%, Min-U-Sil 5 $SiO_2$ powder 79.0% dry weight and 39.5% wet weight, 1000 W $B_4C$ 5.00% dry weight and 2.50% wet weight, PolarGel bentonite powder (Item#354) 1.00% dry weight and 0.500% wet weight, and 37.5% water, based on sodium silicate solids content of 37.45%. The pH of example 1 is 11.2±1.0, the specific gravity is 1.45±0.05, and the total solids content is 50±0.3%. Example 1 is prepared by placing the liquid ingredients in a clean, relatively dry mixing container. While mixing, the remaining ingredients are added slowly to the mixture to prevent the powders from clumping and sticking to the side of the mixing container. The mixture is then mixed at high power for at least 20 minutes depending on the configuration of the mixer. The mixing was carried out in a high shear mixer with a 2.5 inch Cowles Hi-Shear Impeller blade with a 0.5 horsepower motor generating 7500 rpm without load.

Example 2 contains N grade Sodium Silicate 15.0% dry weight and 20.0% wet weight based on sodium silicate solids content of 37.45%, min-U-Sil 5 $SiO_2$ powder 69.0% dry weight and 34.5% wet weight, 1000 W $B_4C$ 15.0% dry weight and 7.5% wet weight, PolarGel bentonite powder (Item#354) 1.00% dry weight and 0.500% wet weight, and 37.5% water, based on sodium silicate solids content of 37.45%. The pH of example 2 is 11.2±1.0, the specific gravity is 1.45±0.05, and the total solids content is 50±0.3%. Example 2 is prepared in the same fashion as example 1.

Example 3 contains N grade Sodium Silicate 15.0% dry weight and 20.0% wet weight based on sodium silicate solids content of 37.45%, min-U-Sil 5 $SiO_2$ powder 79.0% dry weight and 39.5% wet weight, boron silicide 5.00% dry weight and 2.50% wet weight, PolarGel bentonite powder (Item#354) 1.00% dry weight and 0.500% wet weight, and 37.5% water, based on sodium silicate solids content of 37.45%. The pH of example 3 is 11.2±1.0, the specific gravity is 1.45±0.05, and the total solids content is 50±0.3%. Example 3 is prepared in the same fashion as example 1.

Example 4 contains N grade Sodium Silicate 15.0% dry weight and 20.0% wet weight based on sodium silicate solids content of 37.45%, min-U-Sil 5 $SiO_2$ powder 79.0% dry weight and 39.5% wet weight, iron oxide 5.00% dry weight and 2.50% wet weight, PolarGel bentonite powder (Item#354) 1.00% dry weight and 0.500% wet weight, and 37.5% water, based on sodium silicate solids content of 37.45%. The pH of example 4 is 11.2±1.0, the specific gravity is 1.45±0.05, and the total solids content is 50±0.3%. Example 4 is prepared in the same fashion as example 1.

An example of the present design involved adding high emissivity coated panels to the entire inside of a direct fired traveling tray (tunnel) oven. The resultant oven reduced the baking time and increased production by 5%. Anticipated reduction of baking time and increase of production up to 20% is expected. Energy efficiency of over 20% was achieved. Additionally having emissivity panels disposed throughout the entire inside of the oven resulted to more consistent product height. Excess air was reduced by 2.7 times. The combustion efficiency of the direct fired traveling tray oven was increased by 27%. Improvements to baking overall are expected to be a reduction of baking time by up to 50% resulting in the increased productivity of the oven, and reduction of the amount of energy up to 50% needed to bake a unit mass of product.

It is to be understood that the present design is not limited to the embodiments described above, but encompasses any and all embodiments within the scope of the following claims.

What is claimed is:

1. A process of making a food product, comprising:
providing an oven having
a housing including a ceiling, a floor, two opposite side walls, and an opening therethrough forming at least one internal heating zone for receiving an oven cooking accessory therein;
heating means comprising burners, burners shielded by burner shields, or elements for providing heat to the heating zone; and
a high emissivity thermal protective layer disposed on at least one substrate surface therein in which
the substrate surface comprises a metal or ceramic surface disposed within the oven housing, and is taken from the group consisting of
the floor, ceiling, or side walls of the housing,
the burners, burner shields, or elements of the heating means,
an accessory disposed within the housing, or
combinations thereof;
wherein the high emissivity thermal protective layer comprises
from about 5% to about 30% of an inorganic adhesive, from about 45% to about 92% of at least one filler, and from about 1% to about 25% of one or more emissivity agents; or
from about 5% to about 35% of colloidal silica, colloidal alumina, or combinations thereof, from about 23% to about 79% of at least one filler, and from about 1% to about 25% of one or more emissivity agents;
providing a cooking accessory for holding a mixed recipe or prepared dough during heating;
holding the mixed recipe or prepared dough in the cooking accessory; and
heating the cooking accessory in at least one heating zone until the food product is ready;
thereby making a uniformly cooked food product.

2. The process of making a food product according to claim 1, wherein:
the thermal protective layer further comprises from about 1.0% to about 5.0% of a stabilizer;
the thermal protective layer further comprises a surfactant or dispersant;
the thermal protective layer further comprises a colorant;
the inorganic adhesive is taken from the group consisting of an alkali/alkaline earth metal silicate taken from the group consisting of sodium silicate, potassium silicate, calcium silicate, and magnesium silicate;
the filler is taken from the group consisting of silicon dioxide, aluminum oxide, titanium dioxide, magnesium oxide, calcium oxide, and boron oxide;
the one or more emissivity agents are taken from the group consisting of silicon hexaboride, boron carbide, silicon tetraboride, silicon carbide, molybdenum disilicide, tungsten disilicide, zirconium diboride, cupric chromite, and metallic oxides; or
combinations thereof;
the stabilizer is taken from the group consisting of bentonite, kaolin, magnesium alumina silica clay, tabular alumina, and stabilized zirconium oxide;
the thermal protective layer is from about one (1) mils (about 25 microns (μ) to about four (4) mils (about 100 μ) thick; or
combinations thereof.

3. The process according to claim 1, wherein:
a thermal protective layer contains
from about 5% to about 30% of an inorganic adhesive, the inorganic adhesive is taken from the group consisting of an alkali/alkaline earth metal silicate taken from the group consisting of sodium silicate, potassium silicate, calcium silicate, magnesium silicate, and polysilicate; from about 45% to about 92% of at least one filler, the filler taken from the group consisting of silicon dioxide, aluminum oxide, titanium dioxide, magnesium oxide, calcium oxide, and boron oxide; and from about 1% to about 25% of one or more emissivity agents taken from the group consisting of silicon hexaboride, boron carbide, silicon tetraboride, silicon carbide, molybdenum disilicide, tungsten disilicide, zirconium diboride, cupric chromite, and metallic oxides;

from about 5% to about 35% of colloidal silica, colloidal alumina, or combinations thereof; from about 23% to about 79% of at least one filler taken from the group consisting of silicon dioxide, aluminum oxide, titanium dioxide, magnesium oxide, calcium oxide, and boron oxide; and from about 1% to about 25% of one or more emissivity agents taken from the group consisting of silicon hexaboride, boron carbide, silicon tetraboride, silicon carbide, molybdenum disilicide, tungsten disilicide, zirconium diboride, cupric chromite, and metallic oxides;

from about 5% to about 30% of an inorganic adhesive, the inorganic adhesive is taken from the group consisting of an alkali/alkaline earth metal silicate taken from the group consisting of sodium silicate, potassium silicate, calcium silicate, magnesium silicate, and polysilicate; from about 45% to about 92% of at least one filler, the filler taken from the group consisting of silicon dioxide, aluminum oxide, titanium dioxide, magnesium oxide, calcium oxide, and boron oxide; and from about 1% to about 25% of one or more emissivity agents taken from the group consisting of silicon hexaboride, boron carbide, silicon tetraboride, silicon carbide, molybdenum disilicide, tungsten disilicide, zirconium diboride, cupric chromite, and metallic oxides; and from about 1% to about 5% of a stabilizer taken from the group consisting of bentonite, kaolin, magnesium alumina silica clay, tabular alumina, and stabilized zirconium oxide;

from about 5% to about 35% of colloidal silica, colloidal alumina, or combinations thereof; from about 23% to about 79% of at least one filler taken from the group consisting of silicon dioxide, aluminum oxide, titanium dioxide, magnesium oxide, calcium oxide, and boron oxide; and from about 1% to about 25% of one or more emissivity agents taken from the group consisting of silicon hexaboride, boron carbide, silicon tetraboride, silicon carbide, molybdenum disilicide, tungsten disilicide, zirconium diboride, cupric chromite, and metallic oxides; and from about 1.5% to about 5.0% of a stabilizer taken from the group consisting of bentonite, kaolin, magnesium alumina silica clay, tabular alumina, and stabilized zirconium oxide;

from about 10% to about 30% sodium silicate, from about 50% to about 79% silicon dioxide powder, and from about 4% to about 15% of one or more emissivity agents taken from the group consisting of iron oxide, boron silicide, boron carbide, silicon tetraboride, silicon carbide powder, molybdenum disilicide, tungsten disilicide, and zirconium diboride;

from about 10% to about 30% sodium silicate, from about 50% to about 79% silicon dioxide powder, from about 4% to about 15% of one or more emissivity agents taken from the group consisting of iron oxide, boron silicide, boron carbide, silicon tetraboride, silicon carbide powder, molybdenum disilicide, tungsten disilicide, and zirconium diboride, and from about 1% to about 5% of a stabilizer taken from the group consisting of bentonite, kaolin, magnesium alumina silica clay, tabular alumina, and stabilized zirconium oxide;

from about 10% to about 30% colloidal silica, from about 50% to about 79% silicon dioxide powder, and from about 2% to about 15% of one or more emissivity agents taken from the group consisting of iron oxide, boron silicide, boron carbide, silicon tetraboride, silicon carbide molybdenum disilicide, tungsten disilicide, and zirconium diboride; or from about 10% to about 30% colloidal silica, from about 50% to about 79% silicon dioxide powder, from about 2% to about 15% of one or more emissivity agents taken from the group consisting of iron oxide, boron silicide, boron carbide, silicon tetraboride, silicon carbide molybdenum disilicide, tungsten disilicide, and zirconium diboride, and from about 1.5% to about 5.0% of a stabilizer taken from the group consisting of bentonite, kaolin, magnesium alumina silica clay, tabular alumina, and stabilized zirconium oxide.

4. The process according to claim 1, wherein:
a metallic surface forms at least a substrate surface disposed within the oven comprised of iron, aluminum, alloys, steel, cast iron, stainless steel, and combinations thereof.

5. The process of making a food product according to claim 1, further comprising:
a cooking accessory comprising a cooking surface for coming into contact with food;
an outside surface opposite the cooking surface; and
the high emissivity thermal protective layer disposed on a surface of the cooking accessory.

6. The process of making a food product according to claim 1, wherein
the cooking accessory is taken from the group consisting of pans, sheets, forms, racks, and combinations thereof.

7. The process of making a food product, according to claim 1, further comprising:
moving the cooking accessory to facilitate heating in at least two heating zones.

8. The process of making a food product, according to claim 7, wherein:
the cooking accessory is provided on a belt or roller conveyor system having a high emissivity thermal protective layer disposed at least partially thereon.

9. The process of making a food product, according to claim 1, wherein:
the high emissivity thermal protective layer is disposed on at least one coated panel or on a coated insert; the panel or insert distributed within the oven covering at least one wall, floor, ceiling, or combinations thereof.

10. The process of making a food product, according to claim 4, wherein:
the thermal protective layer is disposed on a the cooking accessory is a pan or sheet.

11. The process of making a food product, according to claim 4, wherein:
the thermal protective layer is disposed on a removable accessory including a panel or an insert.

12. The process of making a food product, according to claim 4, further comprising:
the thermal protective layer is disposed on at least one rack disposed within the housing to support the food product.

13. The process of making a food product, according to claim 4, further comprising:
    the thermal protective layer is disposed on a conveyor, belt, roller, or combination thereof disposed within the housing to move the food product between heating zones.

14. The process of making a food product, according to claim 4, wherein:
    the housing further comprises a door and backwall opposite the door having the thermal protective layer disposed on a substrate surface of the door, backwall, or combinations thereof.

15. The process of making a food product according to claim 4, wherein:
    the thermal protective layer is disposed on a substrate surface of the burner shield.

\* \* \* \* \*